United States Patent [19]
Alpert

[11] Patent Number: 5,896,831
[45] Date of Patent: Apr. 27, 1999

[54] SUPPORTING APPLIANCE FOR ANIMALS

[76] Inventor: Selma Alpert, 12720 Vose St., North Hollywood, Calif. 91605-5029

[21] Appl. No.: 08/868,510

[22] Filed: Jun. 4, 1997

[51] Int. Cl.$^6$ .................................................. A01K 29/00
[52] U.S. Cl. ............................ 119/856; 119/792; 119/907
[58] Field of Search ................................. 119/727, 725, 119/792, 856, 907

[56] References Cited

U.S. PATENT DOCUMENTS

| | | | |
|---|---|---|---|
| 2,826,172 | 3/1958 | Buckle et al. | 119/792 |
| 4,559,906 | 12/1985 | Smith | 119/907 X |
| 5,099,800 | 3/1992 | Fitzpatrick et al. | 119/907 X |
| 5,469,812 | 11/1995 | Burks | 119/728 |
| 5,531,187 | 7/1996 | Ward | 119/856 |
| 5,775,970 | 7/1998 | Klees et al. | 119/792 |

*Primary Examiner*—Robert P. Swiatek

[57] ABSTRACT

A supporting appliance for animals having a weak back includes a harness for encircling the animal's shoulder, a brace that extends the length of the animal's back and a girth that encircles the animal's body. The brace provides support for the animal's back so that the animal may undertake normal movements otherwise difficult or prevented due to insufficient back strength. Alternately, the brace may be oriented on the halter and girth so that when the appliance is secured to the animal, the brace lies along and provides support for the animal's stomach. A second brace may also be attached to the halter and girth such that when the appliance is secured to the animal, a combination of support to the animal's back and stomach is provided. The appliance may include a plurality of girths or a single girth in the form of a unitary band that extends essentially the length of the animal's back.

15 Claims, 3 Drawing Sheets

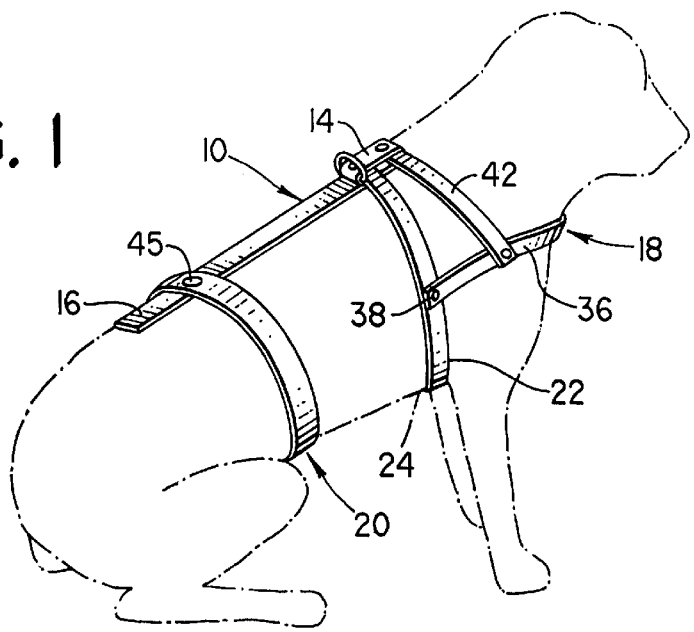
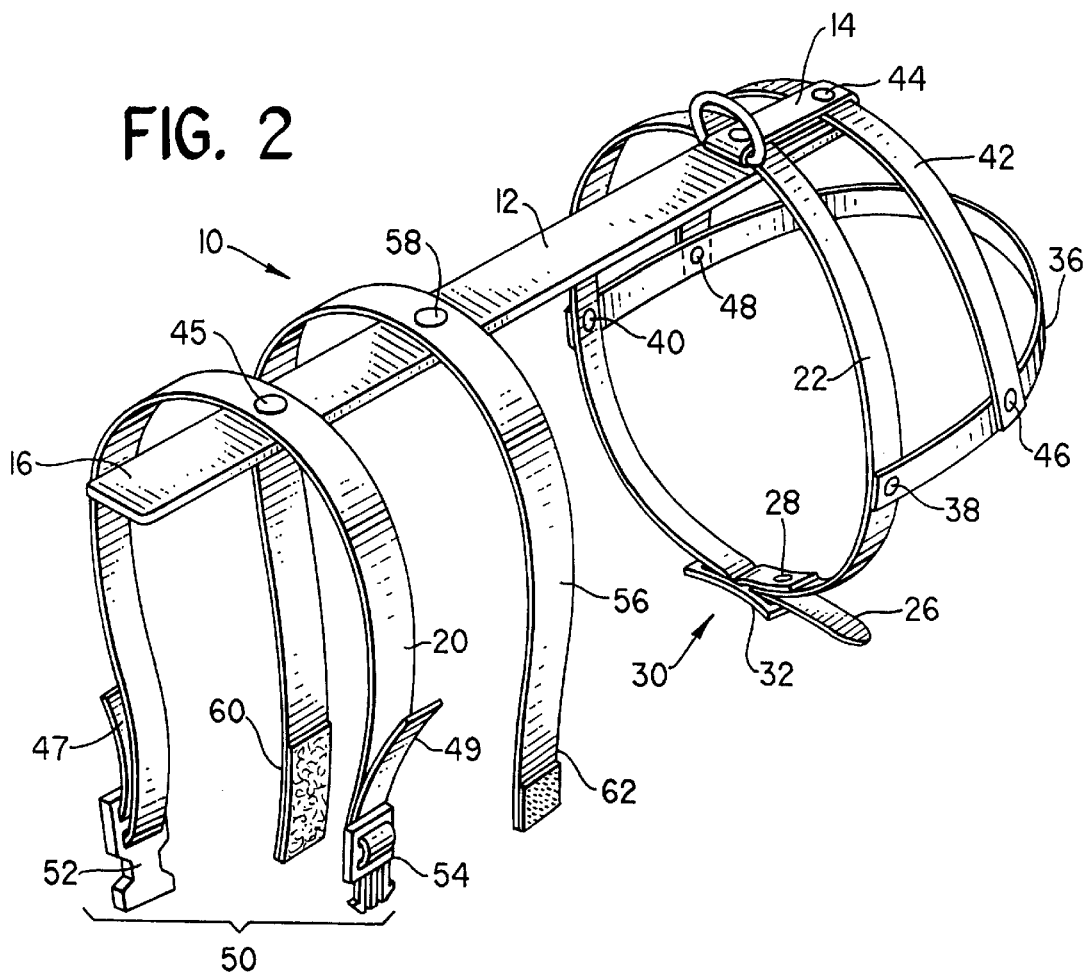

SUPPORTING APPLIANCE FOR ANIMALS

BACKGROUND OF THE INVENTION

1. Field of the Invention

The invention relates generally to orthopedic devices for animals, and more particularly to an appliance to be secured to an animal to provide back support to remedy a weak or ailing back.

2. Description of the Related Art

As animals age they undergo weakening of their bodies, and in particular their backs. It is not uncommon, for example, in a long bodied breed of dog, for them to suffer from a herniated disk, leading to partial or even complete paralysis. Older beagles for instance may suffer from herniated disks because their legs are short, and in proportion their backs tend to be very long, making them assume a swayback posture leading generally to inflamed disks. As inflammation continues the disks tend to deteriorate. In such cases, appliances in the form of a two-wheel carriage have been used to support the animal's hind quarter so that the animal's movement may be facilitated by using only the animal's front legs. Other symptoms of weakening and deteriorating bodies are manifest in a sagging stomach and weakening of leg muscles.

In distinct contrast for humans, not only is medication available to alleviate such problems, but orthopedic braces, in many forms, are available to facilitate walking, sitting and other normal body activities. For animals, on the other hand, if medication fails to remedy their failing condition, the animal exists in a painful and diminished capacity, has expensive and and often times futile surgery or is mercifully put to sleep. To assist such animals, it would be useful and helpful to provide a supporting appliance for reinforcing an animal's back which would be lightweight, easy to apply, comfortable to the animal, easy to store and inexpensive. The supporting appliance should not interfere with the animal's motion, but, to the extent possible, restore the animal's ability to move in a more normal fashion.

OBJECTS OF THE INVENTION

Accordingly, it is an object of the present invention to provide an appliance to be secured to an animal to support a failing or weakened back.

Another object of the present invention is to provide an appliance to be secured to an animal to support a sagging stomach.

Yet another object of the present invention is to provide an appliance to be secured to an animal to support both a failing back and a sagging stomach.

Still another object of the present invention is to provide an appliance that is fabricated from strong yet lightweight, relatively inexpensive and durable materials.

Still further objects and advantages will become apparent from a consideration of the ensuing description and accompanying drawings.

BRIEF DESCRIPTION OF THE DRAWINGS

FIG. 1 shows an illustrative embodiment of the invention applied to an animal (a dog shown in phantom lines)

FIG. 2 shows an embodiment of the invention illustrating alternate cinching arrangements.

SUMMARY OF THE INVENTION

Figure 3:
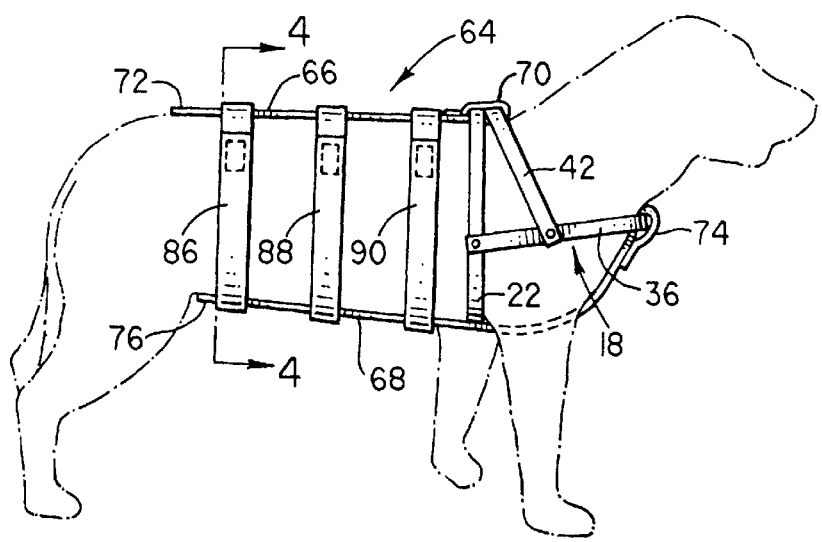
FIG. 3 shows an alternate embodiment of the invention including a plurality of cinches.

The present invention addresses the above and other needs by providing a supporting appliance capable of providing support to an animal having a weak or ailing back. The appliance is configured to include a harness that is adapted to encircle the animal's shoulder, a brace that extends substantially the length of the animals back and at least one girth encircling the animals body in the region of the animal's rump or flank, stomach and/or chest, as the case may be, to provide optimum utility. The harness is attached to the proximal end of the brace, whereas the girth is attached to the distal end of the brace so that the appliance, when applied to the animal, provides support along the animal's back thereby facilitating normal animal movement. Thus for an animal that can no longer walk without difficulty, falling or dropping, the appliance provides firm yet comfortable support that enables the animal to walk, sit, eat, bend and the like without falling or instability.

In an alternate embodiment, the appliance may be configured for providing support to an animal that suffers from a sagging or extended stomach. Accordingly, the brace is positioned to extend substantially the length of the animal's stomach and the harness and the at least one girth are positioned to be cinched, for example, in the region of the animal's back. It should be apparent that the configuration to support the animal's stomach is a dual or reverse orientation of the embodiment for supporting the animal's back.

In yet another alternate embodiment, dual braces may be provided, one brace for supporting the animal's back and the other brace for supporting the animal's stomach. In such case the cinches may be positioned in the region of the animal's ribs or other convenient location to provide for securing the appliance to the animal, while maintaining the braces at the desired location.

In accordance with one aspect of the invention, the brace may be formed of rigid, semi-rigid or even flexible material to accommodate varying degrees of disability, the rigid brace being suitable for the weakest back condition and the flexible brace being suitable for less severe conditions. The appliance is easy to wear, lightweight and simple to apply and to remove from the animal. Of course the length of the brace may be selected to accommodate various sized animals.

The appliance may also include more than one girth to provide intermediate support along the animal's body. In this manner more serious cases of back deterioration may be treated.

A still further embodiment includes a single wide band of flexible material in place of one or more relatively thin girth's, sized to wrap around an animal's body. The width of the band is dimensioned to extend essentially the length of the animal's back. The band when secured in place not only provides back and stomach support but also provides complete support to the animal's rib cage.

PREFERRED EMBODIMENT—DESCRIPTION

Referring now to the drawings, and in particular to FIGS. 1 and 2, the supporting appliance of the present invention, indicated generally by the reference numeral 10, includes a brace 12 having a proximal end 14 and a distal end 16; a halter 18 attached to the proximal end 14; and a girth 20 attached to the distal end 16. Although FIG. 1 depicts the appliance 10 applied to a dog, it is to be understood that the appliance 10 may be applied to any animal having a similar anatomical structure. Brace 12 may be in the form of a rigid rod made for example, of metal or plastic or other available materials. The rigidity of the rod is dependent upon the severity of the need and in those cases where mild support is prescribed a semi-rigid or even a flexible rod may be used.

Halter 18 is adapted to be secured around the shoulder of an animal and includes strap 22 which is attached to the proximal end 14 and when applied, encircles the body of the animal in the region of the animal's chest 24. Strap 22 has free ends 26 and 28, and as shown in FIG. 2, the free ends 26 and 28 are attached to a cinch 30. In the example shown, cinch 30 is a conventional buckle 32, such that when the free ends 26 and 28 are buckled together the strap 22 may be tightened around the animal's chest. Halter 18 further includes strap 36 having free ends 38 and 40 which are attached to the right and left sides of strap 22, respectively, such that when applied, strap 36 encircles the animal's brisket. Halter 18 still further includes strap 42 which, at its midpoint 44, is attached to the proximal end 14 and its end points 46 and 48 is attached to the right and left sides of strap 36 respectively. Strap 42 serves to maintain strap 36 high on the animal's brisket.

Girth 20 is attached preferably at its midpoint 45, to the distal end 16 and its end points 47 and 49 are attached to cinch 50. Cinch 50, as shown in FIG. 2, may be a conventional snap-in type buckle having interlocking mating portions 52 and 54 such that when the mating portions are interlocked, girth 20 is secured about the animal's body in the region of the animal's flank and may thereafter be tightened by pulling on free ends 47 and 49.

In typical usage, the harness 18 is placed on the animal such that the animal's head protrudes between straps 36 and 42. Free end 26 of strap 22 is inserted in buckle 32 then tightened to the extent that the harness fits snugly about the animal's shoulder. In a similar fashion, girth 20 is placed about the animal's body and free ends 47 and 49 are interlocked by means of cinch 50. Free ends 47 and 49 may then be pulled apart so as to tighten the girth 20 about the animal's body. In this manner, the appliance is applied to the animal so that it may proceed with sufficient back support to undertake normal movement without instability or falling.

The present invention may be enhanced by the addition of strap 56 secured preferably at its midpoint 58, to the brace 12 between the proximal end 14 and the distal end 16. As shown in FIG. 2, strap 56 free ends 60 and 62 may be attached to conventional Velcro type fasteners so that securing and tightening the strap 56 about the animal's body may be readily accomplished. It is to be understood that cinches 30 and 50 may also be (but not limited to) Velcro and interlocking type fastening arrangements.

For those animals suffering from a sagging or extended stomach, the placement of the brace 12 and cinches 30 and 50 may be reversed with respect to the embodiment shown in FIGS. 1 and 2. Accordingly, the brace 12 would be positioned along the animal's stomach, whereas the cinches 30 and 50 may be positioned along the animal's back. In this manner (not shown), support would be provided to bolster an animal's sagging stomach and therefore mitigate the harmful effects to the animal's anatomy caused by such sagging stomach.

Furthermore, for extreme conditions where both back and stomach support must be provided, a combination of both back and stomach braces may be configured in the manner previously described. Thus, in accordance with the foregoing teachings, a first brace may be secured to the halter 18 and the girth 20 and positioned for alignment with an animal's back in combination with a second brace secured to the halter 18 and the girth 20 and positioned for alignment with the animal's stomach. In such manner, the brace for supporting the animal's back and the brace for supporting the animal's stomach cooperate to alleviate the suffering an animal undergoes as a result of the weakening of its back and stomach.

More specifically, an alternate embodiment of the present invention, shown in FIG. 3, is adapted for use on an animal requiring rigid or semi-rigid support for both the animal's back and stomach. Appliance 64 includes the halter 18 of FIG. 1 and a top brace 66 and a bottom brace 68 oriented in alignment with the animal's back and stomach respectively. Top brace 66 spans the animal's back from its proximal end 74 to its distal end 76. The proximal end 70 includes a fastener comprising Velcro segments 78 and 80. For attachment of brace 66 to halter 18, the proximal end 70 may be looped around the upper portion of the halter 18 (as shown in FIG. 3) about straps 22 and 42 and the Velcro segments 78 and 80, pressed together for locking arrangement.

In a similar fashion, the proximal end 74 includes a fastener comprising Velcro segments 82 and 84. For attachment of brace 68 to halter 18, the proximal end 74 may be looped about strap 36 and the Velcro segments 82 and 84 pressed together in locking engagement. Attached to braces 70 and 74 in spaced apart relationship are girth 86 and intermediate straps 88 and 90. The strap 90 is positioned to encircle the animal's body essentially in the region defined by the animal's chest, whereas strap 88 is located between girth 86 and strap 90 about mid-way therebetween. The girth 86 and straps 88 and 90 include at their terminal ends, Velcro segments 92 and 94; 96 and 98; and 100 and 102 respectively.

In practice the appliance 64 may be oriented on an animal such that the brace 66 is in alignment with the animal's back and brace 68 is in alignment with the animal's stomach. The girth 86 and straps 88 and 90 may then be looped about the animal and the respective Velcro segments then pressed together for locking arrangement. Accordingly, when in place the brace 64 provides uniform support along the animal's body from its withers to its rump.

Figure 4:
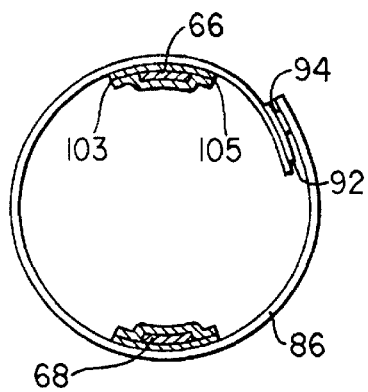
FIG. 4 is a cross-sectional view of a cinch taken along lines 4—4 of FIG. 3.
Figure 5:
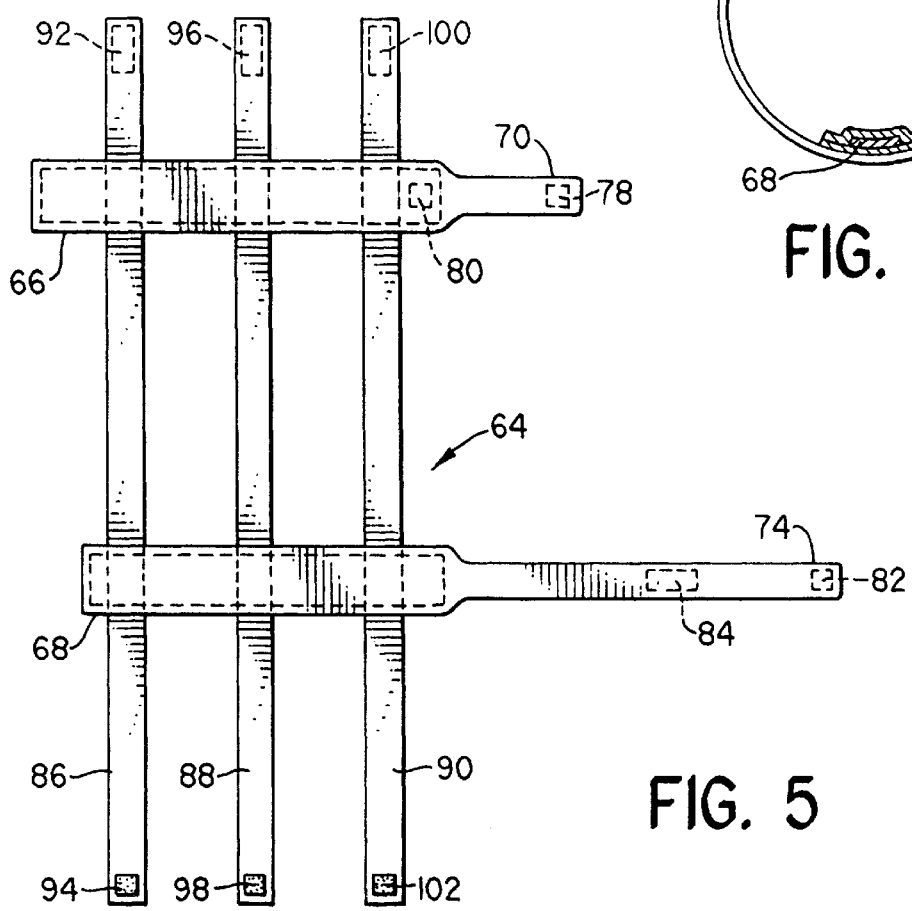
FIG. 5 is a top plan view of the invention of FIG. 3.

Referring now to FIG. 4, girth 86 is shown in cross-sectional view taken along lines 4—4 of FIG. 3. Braces 66 and 68 are attached to girth 86 by any one of a number of conventional means such as sewing and the like. As shown in FIG. 4 brace 66 is locked in place between grips 104 and 106 which grips may be sewn together, for example, and attached to girth 86 by means of sewing or adhesive and the like. As further shown in FIG. 4, Velcro segments 92 and 94 are arranged in locking engagement so as to secure the appliance on the animal.

Figure 6:
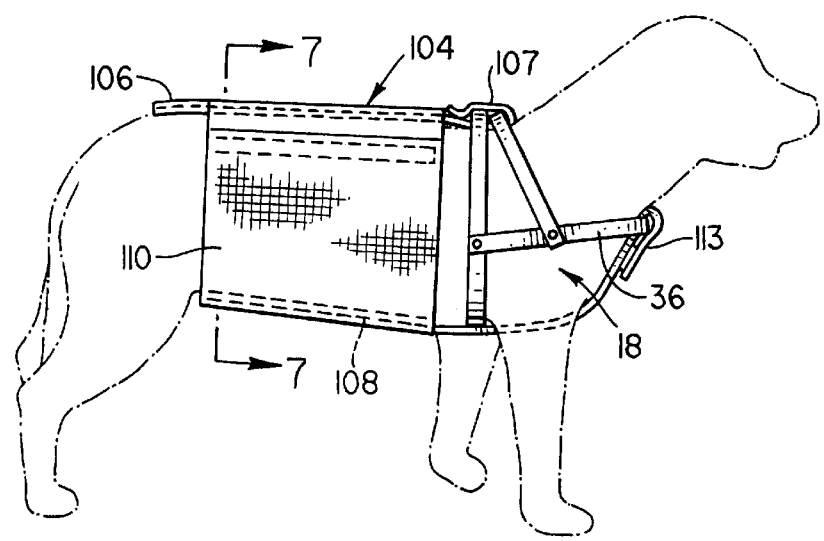
FIG. 6 shows an alternate embodiment of the invention including a unitary flexible band for encircling the animal's body.

A still further embodiment of the present invention is shown in FIG. 6. Appliance 104 includes the halter 18 of Fig.1 and a top brace 106 and a bottom brace 108. Braces 106 and 108 are configured in a fashion consistent with that of braces 66 and 68, such that the proximal end 107 of brace 106 may be wrapped around the upper portion of halter 18 and secured thereto by the locking engagement between mating Velcro segments 109 and 110 and the proximal end 113 of brace 108 may be wrapped around strap 36 and secured thereto by the locking engagement between Velcro segments 115 and 117. Braces 106 and 108 are attached to flexible band 110 such that when the band 110 is wrapped around an animal in a sleeve-like arrangement, the brace 106 is in alignment with the animal's back and brace 108 is in alignment with the animal's stomach.

Figure 7:
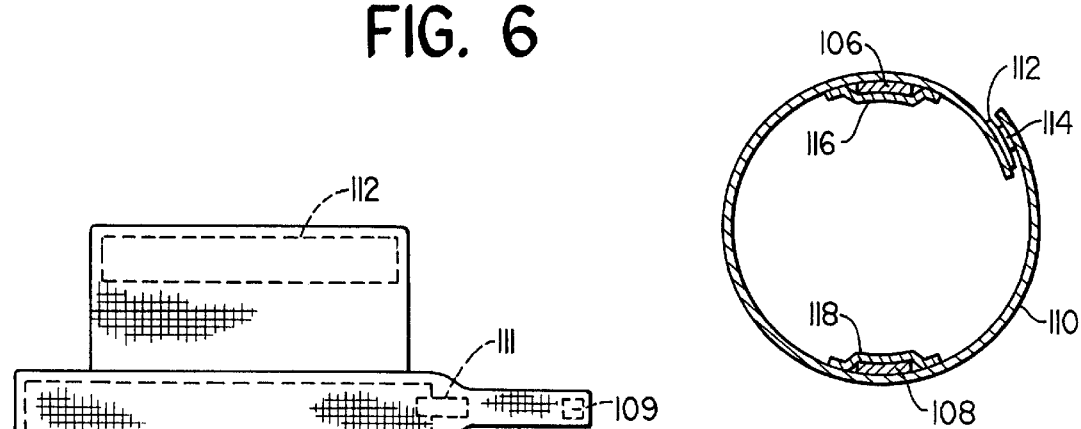
FIG. 7 is a cross-sectional view of the band taken along the lines 7—7 of FIG. 6.

The band 110 includes Velcro segments 112 and 114 such that when the band 110 is wrapped around the animal's body, as shown in FIG. 6, such segments may be may be pressed together in locking arrangement to thereby secure the appliance 104 to the animal. As shown in cross-sectional view of FIG. 7, grips 116 and 118, which may be sewn to band 110, serve to anchor brace 106 and brace 108, respectively, to band 110.

Figure 8:
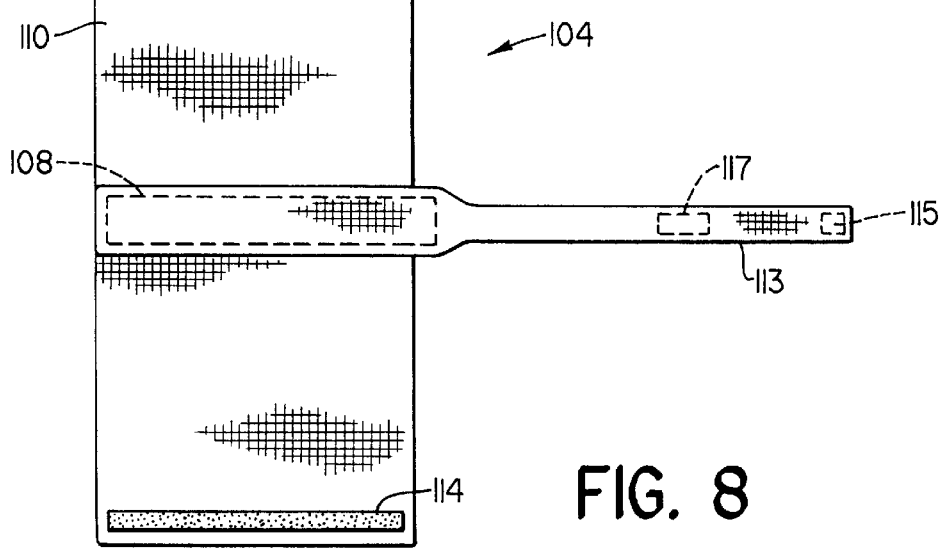
FIG. 8 is a top plan view of the band of FIG. 6.

The embodiment of FIG. 8 provides support to an animal requiring a total body support. Band 110 thus not only accommodates back and stomach support through braces 106 and 108 but also provides total rib cage and mid-body support.

Although the invention has been described relative to a specific embodiment thereof, there are numerous variations and modifications that will be readily apparent to those skilled in the art in light of the above teachings. For example, a variety of materials and shapes thereof may be used to achieve the unique structure of the present invention without departing from the scope thereof. For example, the brace 12 may be formed of rigid metal or plastic and the like, in the shape of a flat planar rod or a cylindrical rod. The flat planar rod may be curved to fit to the contour of the animals back. The straps may be formed of leather, woven fabric or plastic, and the like, and the buckle arrangements may also include conventional belt buckle and hook and eyelet arrangements as well as Velcro segments.

Thus the scope of the invention should be determined by the appended claims and their legal equivalents, rather than by the examples given.

What is claimed is:

1. A supporting appliance for animals comprising:
   a supporting brace having a proximal end and a distal end;
   a halter attached to the proximal end of the supporting brace and adapted to be secured around the shoulder of the animal; and
   a girth immovably attached to the distal end of the supporting brace and adapted to be secured about the flank of the animal, said girth having end portions, the end portions having fastening means adapted to interlock said end portions together, the girth being adjustable to a fixed length about the animal's flank so that when the end portions are interlocked, the girth is maintained at said fixed length independent of the animal's movement.

2. The supporting appliance of claim 1, wherein the halter comprises:
   a first strap attached to the supporting brace and adapted for encircling the animal's chest, the first strap having right and left sides; and
   a second strap adapted for encircling the the animal's brisket, the second strap having terminal ends, one terminal end attached to the right side of the first strap and the other terminal end attached to left side of the first strap.

3. The supporting appliance of claim 2, wherein the second strap has right and left sides, the halter further comprising a third strap attached to the proximal end of the supporting brace, the third strap having ends, one end attached to the right side of the second strap, the other end attached to the left side of the second strap.

4. The supporting appliance of claim 2, wherein the first strap includes a first cinch for securing the first strap about the animal's chest.

5. The supporting appliance of claim 4, wherein the fastening means comprises a second cinch for securing the girth about the animal's flank and maintaining the girth at a fixed length about the flank.

6. The supporting appliance of claim 5, wherein the second cinch comprises a second buckle, the second buckle further including means for tightening the girth about the animal's body.

7. The supporting appliance of claim 4, wherein the first cinch comprises a first buckle, the first buckle further including means for tightening the first strap about the animal's chest.

8. The supporting appliance of claim 1, wherein the supporting brace comprises a rigid rod.

9. The supporting appliance of claim 1, wherein the supporting brace comprises a semi-rigid rod.

10. The supporting appliance of claim 1, wherein the supporting brace is attached to the halter and girth such that when the halter and girth are secured around the animal's shoulder and flank respectively, the supporting brace lies along and in contact with the animal's back for support thereof.

11. A supporting appliance for animals comprising:
    a brace having a proximal end and a distal end;
    a halter attached to the proximal end of the brace and adapted to be secured around the shoulder of an animal; and
    a girth attached to the distal end of the brace and adapted to be secured about the flank of the animal; wherein the brace is attached to the halter and girth such that when the halter and girth are secured around the animal's shoulder and flank respectively, the brace lies along and in contact with the animal's stomach for support thereof.

12. A supporting appliance for animals comprising:
    a first brace and a second brace, each brace having a proximal end and a distal end;
    a halter adapted to be secured around the shoulder of an animal, the proximal end of the first brace and the proximal end of the second brace attached to the halter; and
    a first girth adapted to be secured around the flank of an animal, the distal end of the first brace and the distal end of the second brace attached to the girth, such that when the halter and girth are secured around the animal's shoulder and flank respectively, the first brace lies along and in contact with the animal's back for support thereof and the second brace lies along and in contact with the animal's stomach in support thereof.

13. The supporting appliance of claim 12 comprising a second girth located adjacent the halter and adapted to be secured around the animal in the region of the animal's chest, said second girth being secured to the first brace and the second brace to provide further support for the animal's back and stomach.

14. The supporting appliance of claim 13 comprising a third girth located between the first and second girth and adapted to be secured around the animal in the region of the animal's chest, said third girth being secured to the first brace and the second brace to provide still further support for the animal's back and stomach.

15. The supporting appliance of claim 12 wherein said girth comprises a wide flexible band extending essentially from the chest to the rump of the animal, said band being adapted to be wrapped around the animal in sleeve-like fashion, said band including means for securing the band snugly around the animal's chest to provide full body support.

* * * * *